United States Patent [19]

Ende

[11] 3,712,396
[45] Jan. 23, 1973

[54] OVER-SNOW VEHICLE

[76] Inventor: Don S. Ende, 75 Wiehart Boulevard, Commack, N.Y. 11725

[22] Filed: Jan. 4, 1971

[21] Appl. No.: 103,402

[52] U.S. Cl. ................................ 180/5 R, 280/25
[51] Int. Cl. ............................................. B62m 27/00
[58] Field of Search ............ 180/5, 3; 280/28, 12, 25

[56] References Cited

UNITED STATES PATENTS

| | | | |
|---|---|---|---|
| 2,741,487 | 4/1956 | Carefoot | 280/28 |
| 3,338,589 | 8/1967 | Barton | 280/25 |

FOREIGN PATENTS OR APPLICATIONS

| | | | |
|---|---|---|---|
| 631,338 | 11/1961 | Canada | 180/5 R |

Primary Examiner—Gerald M. Forlenza
Assistant Examiner—John Mannix
Attorney—Laurence J. Marhoefer

[57] ABSTRACT

The specification and drawings disclose a sled resiliently mounted on skis pushed by a self-contained, endless track propulsion unit which has 3° of pivotal freedom with respect to the sled.

11 Claims, 8 Drawing Figures

PATENTED JAN 23 1973 3,712,396

INVENTOR
DON S. ENDE

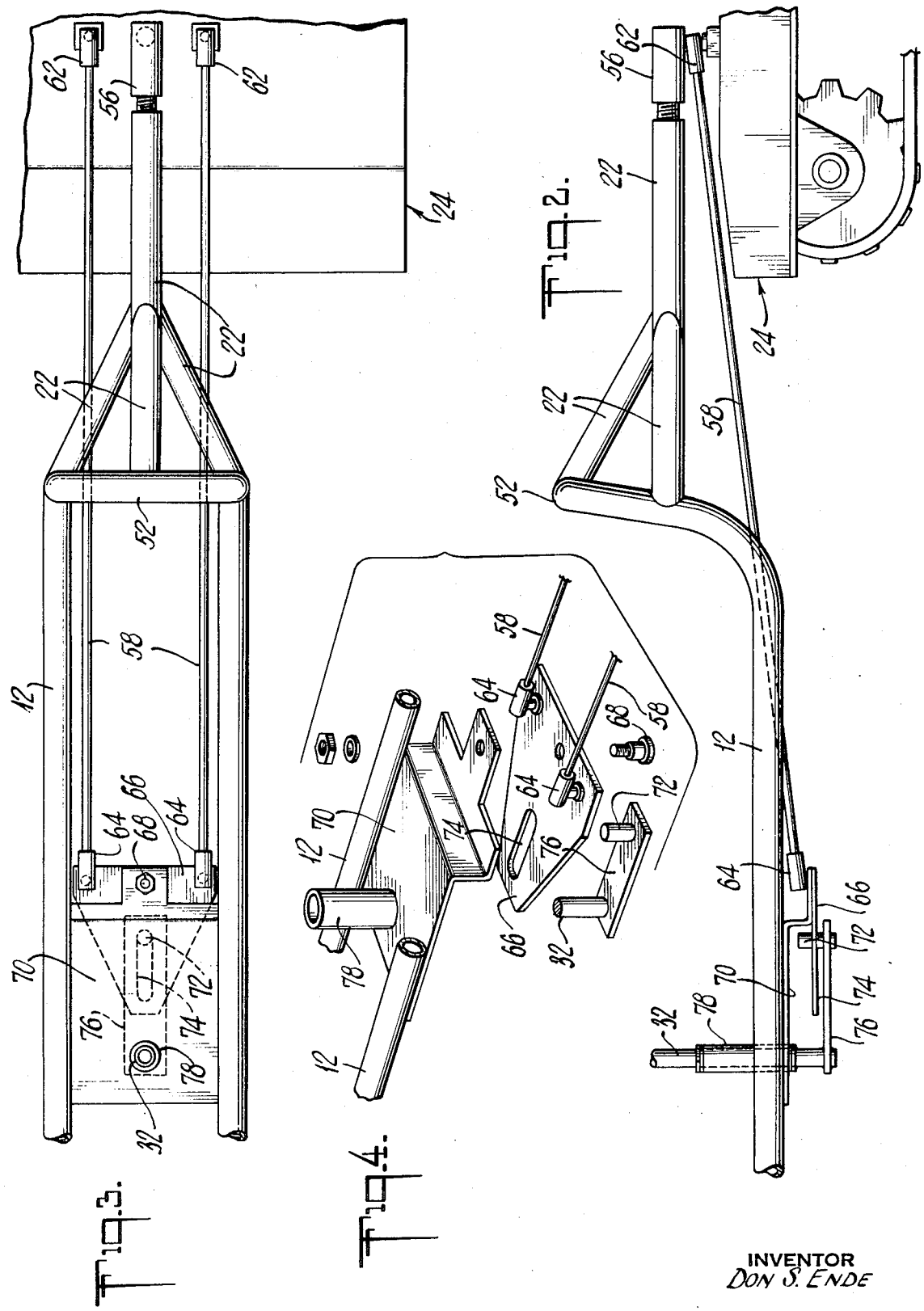

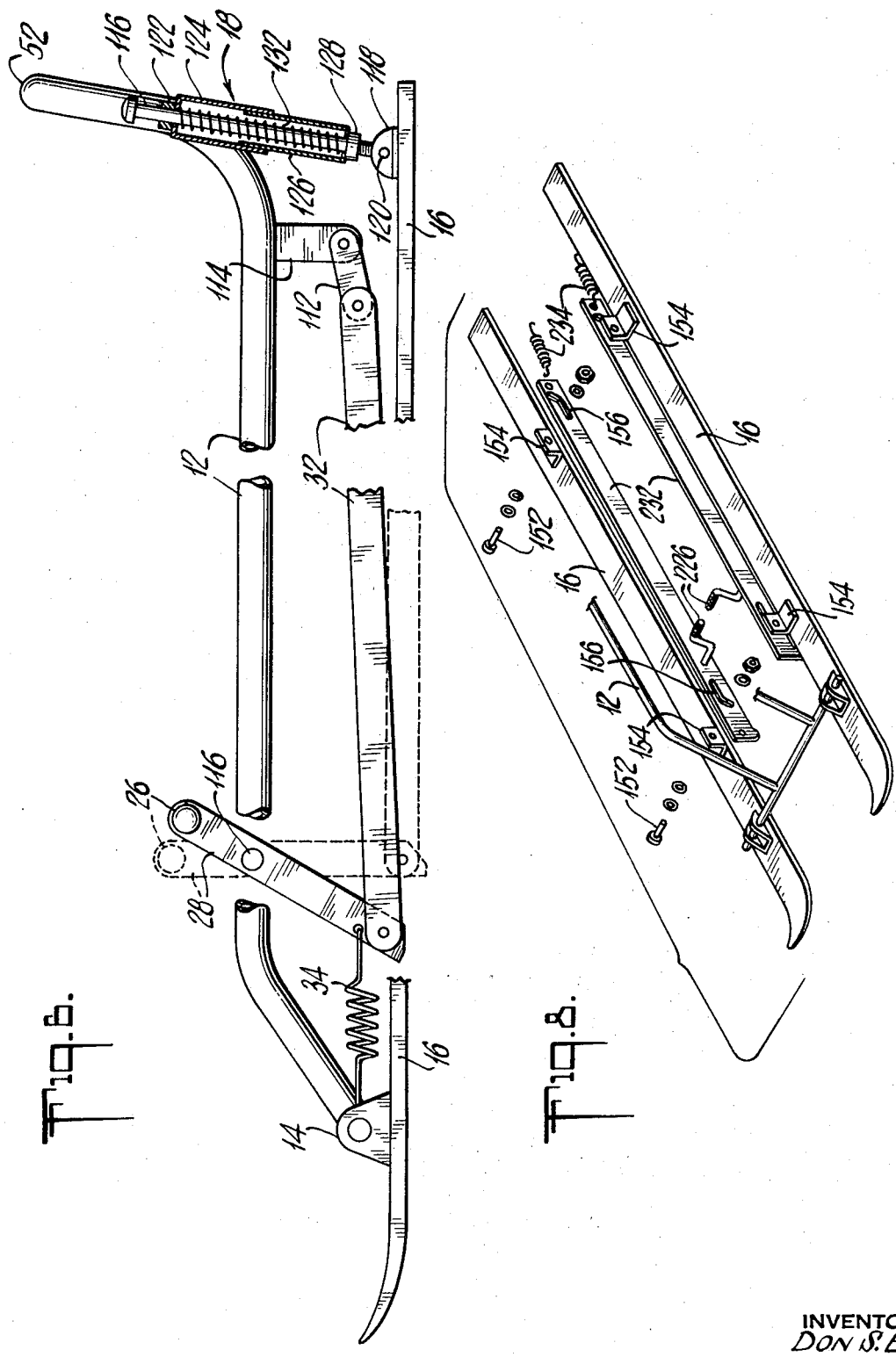

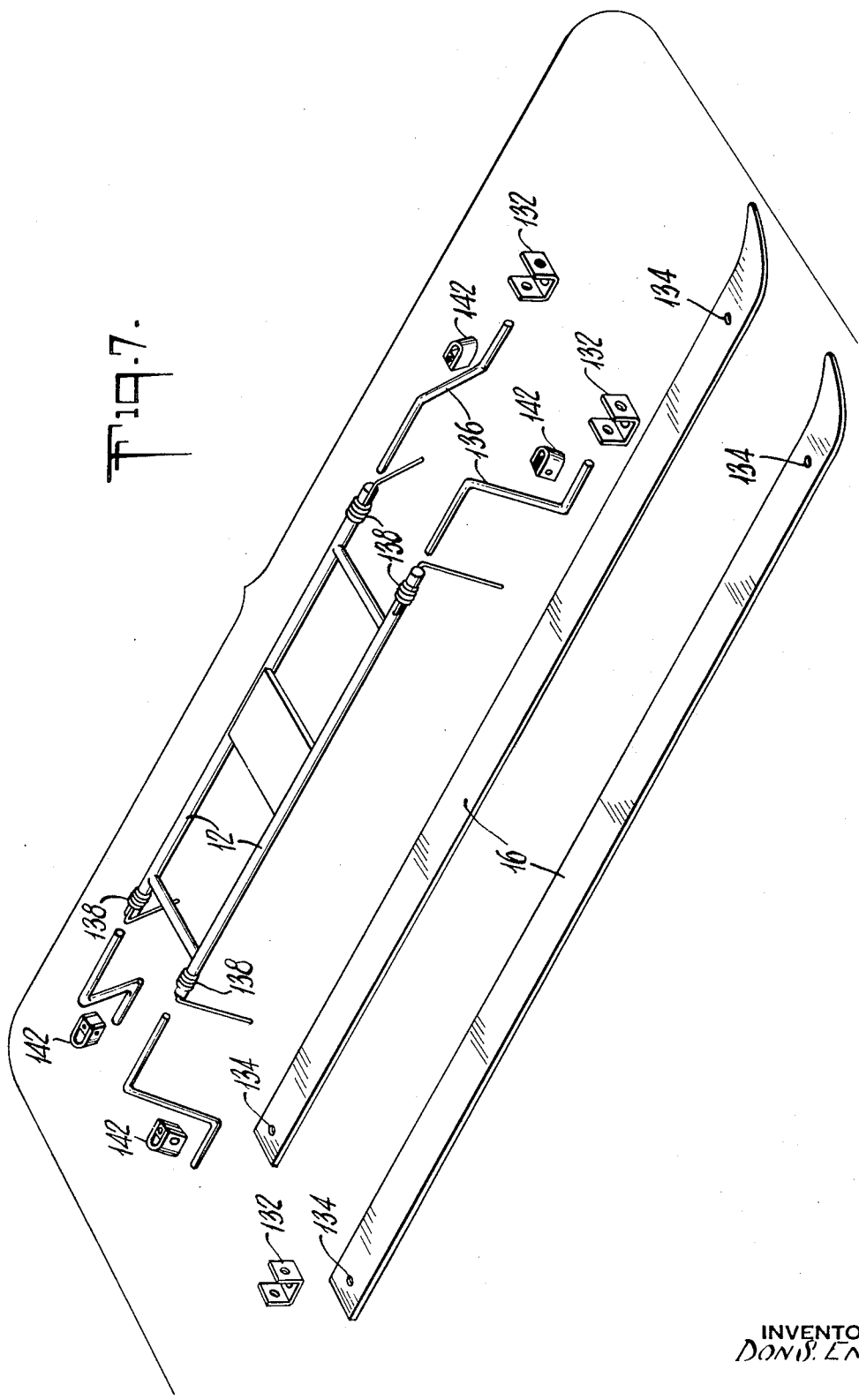

3,712,396

OVER-SNOW VEHICLE

BACKGROUND OF THE INVENTION

This invention relates to a self-propelled, over-snow vehicle and, more particularly, to a novel over-snow vehicle which is particularly well suited for recreational use.

Although proposals have been made in the prior art concerning tractor and sled combinations for over-snow vehicles such proposals have not been practical, and over-snow vehicles in widespread use for recreational purposes have the driver and riders mounted with their legs straddling a seat in a position similar to that of a motorcycle rider. A pair of skis mounted in front of the vehicle is used to steer, and an endless track generally located beneath the seat of the vehicle is used to propel the vehicle. While such prior art over-snow vehicles are generally satisfactory, they are relatively bulky, heavy and difficult to transport. Further, they are relatively costly to manufacture; and, perhaps most importantly, they give a driver very little of the exciting sense of motion that one receives when moving very close to the surface of the snow and very little of the exciting sense of control that one receives on skis.

One object of the present invention is to provide a self-propelled, over-snow vehicle that allows a driver (and rider) of the vehicle to be mounted close to the surface of the snow, thereby enhancing his sense of speed of motion over the snow. In addition, a vehicle constructed in accordance with this invention has steering and handling characteristics generally similar to those experienced in skiing.

Another object of the invention is the provision of a vehicle which is lightweight and economical to manufacture.

An additional object of the invention is to provide an over-snow vehicle which is quickly and easily separable into two relatively compact, lightweight components making the vehicle readily transportable by automobile, for example.

A still further object of the invention is the provision of an over-snow vehicle that can quickly and easily be adjusted for good traction in snow conditions varying from loosely packed powder to tightly compacted snow.

SUMMARY OF THE INVENTION

Briefly, this invention contemplates a novel over-snow vehicle in which a sled is propelled by a separate endless-track propulsion unit that is coupled to the sled by a linkage that allows the propulsion unit three degrees of pivotal motion with respect to the sled. The vehicle is steered by pivoting the propulsion unit with respect to the sled and preferably simultaneously edging a retractable blade into the snow. Skis or runners are resiliently mounted to the sled by adjustable springs. Adjusting the springs varies the load of the sled and driver which is transmitted to the propulsion unit, thereby simply and quickly adjusting the vehicle to the snow conditions.

BRIEF DESCRIPTION OF THE DRAWINGS

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views;

FIG. 2 is a side elevation, with certain parts omitted for clarity, of the over-snow vehicle of FIG. 1;

FIG. 3 is a plan view of the structure shown in FIG. 2;

FIG. 4 is an exploded, isometric view of a steering mechanism detail;

FIG. 6 is a side elevation of a portion of the over-snow vehicle showing certain details omitted in FIGS. 2 and 3;

FIG. 7 is an exploded isometric view of an alternate sled suspension system; and FIG. 8 is an isometric view of an alternate edging mechanism.

DESCRIPTION OF THE PREFERRED EMBODIMENTS

Figure 1:
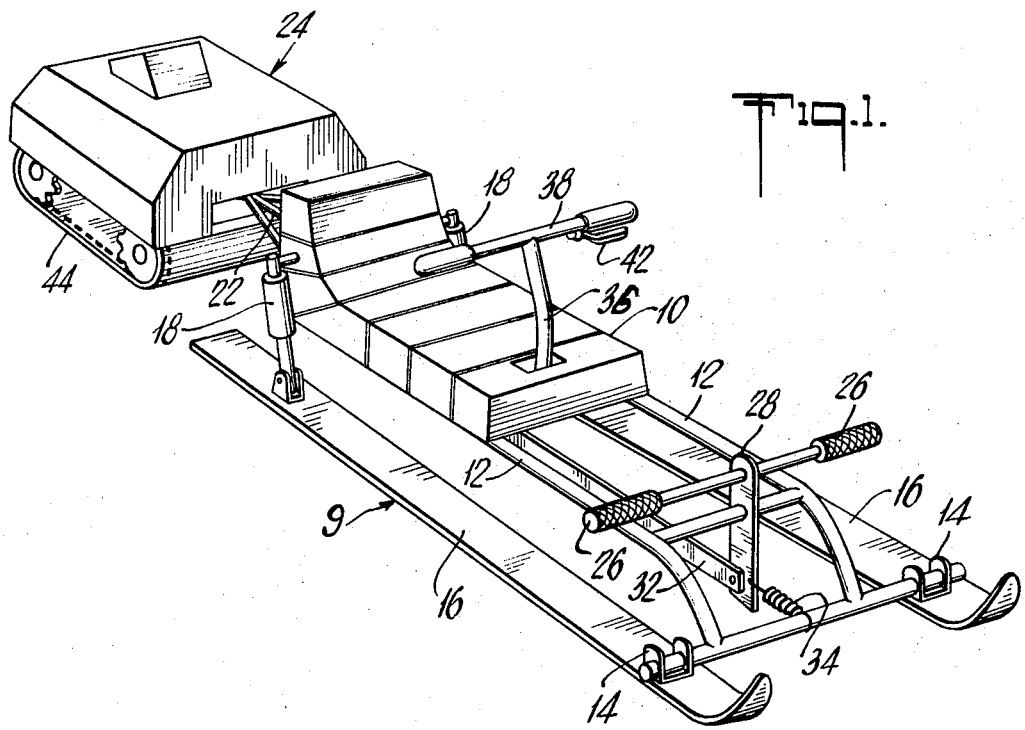
FIG. 1 is an overall isometric view of one embodiment of an over-snow vehicle in accordance with the teachings of this invention.

Referring now to FIG. 1 of the drawings, a sled indicated by the general reference numeral 9 has a cushioned seat or couch 10 mounted on a tubular frame 12 which, in turn, is secured to a pair of skis 16 by means of a pair of adjustable springs 18 and a pair of brackets 14. A linkage 22 couples an endless track propulsion unit, indicated generally by the reference numeral 24, to the frame 12. Preferably, the linkage 22 is rigidly affixed to the frame 12 on one end and coupled to the propulsion unit 24 by means of a ball and socket joint (as will be described more fully hereinafter) allowing the power unit 24 three degrees of rotation freedom with respect to the sled.

A driver mounted on the seat 10 preferably sits upright with his legs extended forward and his feet engaging a pair of foot pedals 26. Although the embodiment of the invention illustrated in the drawings accommodates only the driver comfortably, those skilled in the art will readily appreciate that the vehicle may be easily modified to accommodate a driver and a passenger or passengers by simply extending the couch 10. A link 28 connects the pedals 26 to an edging blade 32 which is held in a retracted position, clear of the snow, by a coiled tension spring 34. When the pedals 26 are pushed forward, the blade 32 moves downwardly and engages the snow to assist in steering and controlling the vehicle as will be more fully explained hereinafter.

The driver's legs straddle a rotatable steering column 36 to which a handle bar 38 is attached. A pair of links (shown and described in FIGS. 2 and 3) couple the steering column 36 to the propulsion unit 24 so that rotation of the handle bar 38 causes the propulsion unit to pivot with respect to the sled 9. Conveniently, the handle bar 38 carries a lever 42 which is coupled by a control cable to a brake caliper which engages a disk on propulsion unit 24 in a manner conventional in the over-snow vehicle art. Similarly, another lever and control cable coupling may be employed for throttle control.

In operation, an internal combustion engine in the propulsion unit 24 drives an endless track 15. Cleats on the track engage the snow and cause the vehicle to move. To steer the vehicle, the handle bar 38 is rotated, rotating the power unit 24 with respect to the sled. In addition, the driver may distend the edging blade 32 into the snow by pushing forwardly on the pedals 26 to give lateral support to the sled during turning. To transport the vehicle by automobile or the like, the power unit 24 can be readily detached from the sled. The invention will become further apparent from the following description of the detailed drawings along with a feature thereof which permits the vehicle to be easily adjusted for conditions ranging from powdered to hard-pack snow.

Referring now to FIGS. 2 and 3 of the drawings, the frame 12 has an upstanding portion 52 which supports the back of the seat 10. It will be noted that the linkage 22 is affixed to the upstanding portion 52 of the frame at three points. A ball and socket coupling 56 couples the other end of the linkage 22 to the propulsion unit 24, thereby allowing 3° of rotation freedom for the power unit 24 relatively to the frame 12.

A pair of ball and socket couplers 62 respectively couple one end of each of a pair of steering rods 58 to the propulsion unit 24. The other end of each rod is coupled by a ball and socket coupling 64 to a bell crank 66. A pin 68 pivotally secures the crank 66 to a plate 70 which is affixed to the frame 12 by any suitable means known in the art, such as welding. A pin 72 rides in a slot 74 in the crank 66; pin 72 is coupled to the steering column 32 by an arm 76. Thus, rotation of the steering column 32, which is supported by suitable collar 78 affixed to plate 70, causes rotation of crank 66 about pin 68. Rotation of crank 66 in a clockwise direction as viewed in FIG. 3, causes clockwise rotation of the propulsion unit 24 about the pivot point of ball and socket coupling 56. Similarly, counterclockwise rotation of the crank produces counterclockwise rotation of the power unit.

Figure 5:
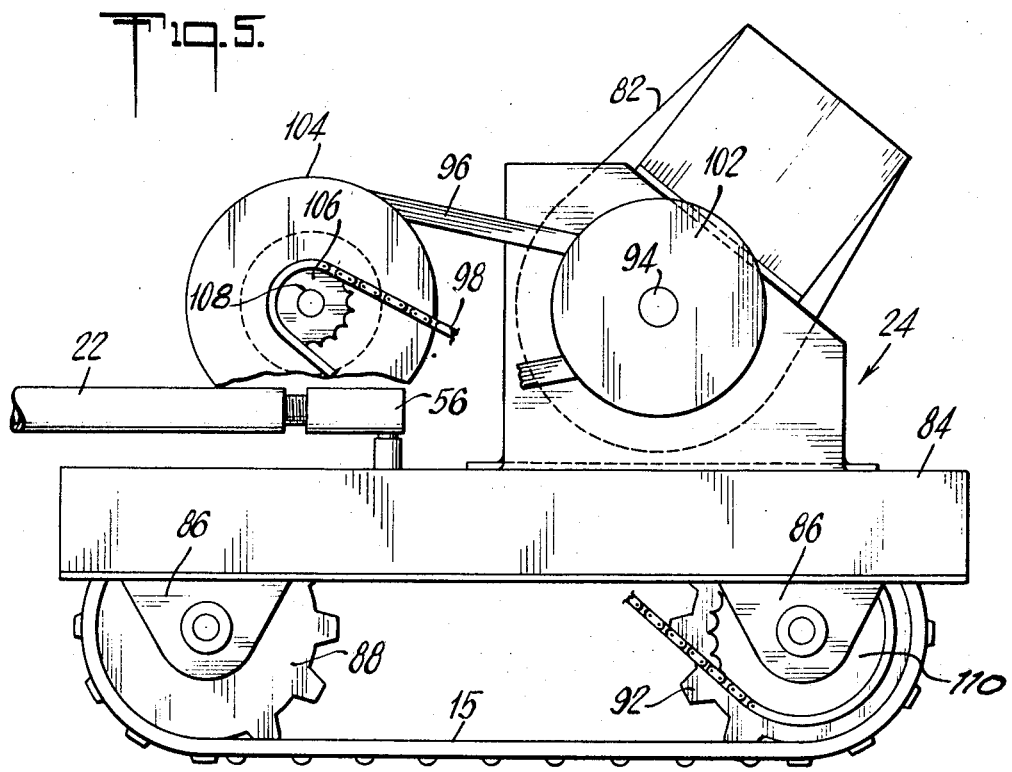
FIG. 5 is a side elevation of a propulsion unit.

FIG. 5 shows the propulsion unit 24 in greater detail. An internal combustion engine 82 is mounted on a chassis 84. Pillow block bearings 86 secured to the chassis 84 support two sprocket idler wheels 88 and two sprocket drive wheels 92. Sprocket holes in the cleated endless belt 15 are engaged by teeth on the drive wheels 92 and idler wheels 88, and rotation of drive wheels 92 causes rotation of the endless belt.

A belt 96 frictionally engages a torque responsive pulley 102 affixed to an output shaft 94 of engine 82 and drives a torque responsive clutch 104 of a type well known in the art, which is affixed to chassis 84. A chain-drive sprocket wheel 106 affixed to an output shaft 108 of the torque responsive clutch 104 drives a chain 98. Chain 98 engages a sprocket 110 affixed to drive wheel 92 and, thusly, power from engine 82 is coupled to the endless track.

Referring now to FIG. 6, preferably the edging blade 32 is a four bar linkage so that the longitudinal extent to which blade 32 penetrates into the snow can be controlled. To this end a short link 112 connects the blade 32 to a tab 114 affixed to the frame 12. Thus, as the arm 28 is pushed forwardly against the tension of spring 34, the leading edge of the blade 32 and arm 28 first penetrate into the snow. Further forward movement of arm 28 results in the entire blade entering the snow. This gives the driver added control both over the amount of edging action and the location at which it is applied.

One of the adjustable springs 18 is shown in section in FIG. 6. Adjustment of the resilient mounting allows adjustment of the portion of the weight of the driver and sled which is transmitted to the propulsion unit 24 and thus allows rapid adjustment of the vehicle to suit snow conditions. In the illustrated embodiment, the resilient mount 18 has plunger rod 116 one end of which is pivotally secured to the ski 16 by a bracket 118 and pin 120. The other end of plunger 116 rides freely in an upper mounting boss 122 affixed to the frame 12. A coiled compression spring 132 is enclosed by an upper housing 124 affixed to boss 122 and a lower telescoping housing 126 affixed to a base nut 128, which threadly engages plunger 116.

By screwing the nut 128 upwardly or downwardly on the plunger 116, the tension in spring 132 is respectively increased or decreased. Increasing the tension in the compression spring decreases the load transmitted to the propulsion unit, and decreasing the tension increases the load.

FIG. 7 shows an alternate form of adjustable, resilient mounting. In this preferred embodiment all the mountings, both fore and aft, are the same, and only one will be described in detail. A bolt (not shown) passing through a hole 134 in the ski 16 secures a pivot bracket 132 to the ski. One end of a suspension arm 136 fits the hole in bracket 132 and the other end telescopically fits into the tubular frame 12. One end of a spring 138 is affixed to frame 12 and its other end fits into a hole in a bracket 142 which releasably clamps onto the suspension arm 136. In operation the suspension arm 136 rotates against the force of the spring arm as a weight is placed on the frame 12 until the tension of the spring balances the weight. Sliding the brackets 142 upwardly or downwardly on the arms 136 decreases and increases respectively the moment arm of the spring and consequentially its apparent stiffness. In this manner, the weight transmitted to the propulsion unit can be varied to suit snow conditions.

FIG. 8 shows an alternate embodiment of edging mechanism. In this embodiment a pair of edging blades 232 are employed, one for each ski. Pins 152 slidably mount the blades 232 on brackets 154 secured to the skis 16. Forward movement of pedals 226 against the urging of return springs 234 cause the blades to move downwardly because of the shape of slots 156 in the blades. It should be noted here, that in operation only one blade at a time is normally used — the one on the side in which the vehicle is turning.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. An over-snow vehicle comprising in combination: a frame for supporting a driver of the vehicle, attaching means, slide means pivotally connected by said attaching means to the front of said frame for running on snow, a propulsion unit including an endless track mounted for rotation about a horizontal axis, a motor and means connecting said motor to said track to rotate said track about said horizontal axis, pivotal coupling means, rigid means, one end of which is rigid with the rear of said frame and the other end coupled by said pivotal coupling means to said propulsion unit in a manner permitting said propulsion unit to rotate relatively to said frame about a vertical axis, the frame being carried through said attaching means and said pivotal coupling means; therefore, transferring a portion of the weight of said frame and a driver thereon to said propulsion unit, and steering means for rotating said power unit about said vertical axis.

2. An over-snow vehicle as in claim 1 further including a blade and means for mounting said blade with respect to said frame so that it is progressively movable between an initial position in which it is clear of said snow, an intermediate position in which the tip digs into said snow, and a final position in which the entire length of blade digs into said snow.

3. An over-snow vehicle as in claim 1 in which said coupling means includes a rigid linkage affixed at one of its ends to said frame, said linkage extending outwardly from the rear of said frame, and a pivotal coupling joining the other end of said linkage to said propulsion unit, said pivotal coupling allowing only 3° of rotational movement of said propulsion unit with respect to said sled.

4. An over-snow vehicle as in claim 3 wherein said pivotal coupling is disposed just forward of the center of the endless track.

5. An over-snow vehicle as in claim 4 wherein said steering means includes a link, one end of which is coupled to said propulsion unit and the other end of which is coupled to the frame and movable with respect thereto.

6. An over-snow vehicle as in claim 3 further including a blade and means for mounting said blade with respect to said frame so that it is progressively movable between an initial position in which it is clear of said snow, and a position in which it digs into said snow.

7. An over-snow vehicle as in claim 3 wherein said frame supports a driver in a sitting position with his legs horizontally extended, and said means for running on snow including a pair of skis and means respectively resiliently coupling each of said skis to said frame.

8. An over-snow vehicle as in claim 7 further including a pair of blades and means for mounting each of each blades respectively on each of said skis so that each is independently movable between a first position clear of said snow, and a second position in which it digs into said snow.

9. An over-snow vehicle as in claim 7 wherein said resilient coupling means is adjustable.

10. An over-snow vehicle as in claim 9 wherein said resilient coupling means respectively couples each of said skis to said frame at a location between the center of gravity of said frame with a driver mounted thereon and said propulsion unit.

11. An over-snow vehicle as in claim 6 wherein said frame supports a driver in a sitting position with his legs horizontally extended, said means for running on snow includes a pair of skis with means respectively coupling said skis to said frame, said blade is substantially co-extensive with said skis, and initially the forward part of said blade digs into the snow as said blade moves between its positions.

* * * * *